United States Patent [19]

Tachihara et al.

[11] Patent Number: 4,719,478

[45] Date of Patent: Jan. 12, 1988

[54] HEAT GENERATING RESISTOR, RECORDING HEAD USING SUCH RESISTOR AND DRIVE METHOD THEREFOR

[75] Inventors: Masayoshi Tachihara, Atsugi; Shinichi Hirasawa, Hiratsuka; Masami Ikeda; Akira Asai, both of Tokyo; Hirokazu Komuro, Hiratsuka, all of Japan

[73] Assignee: Canon Kabushiki Kaisha, Tokyo, Japan

[21] Appl. No.: 910,727

[22] Filed: Sep. 23, 1986

[30] Foreign Application Priority Data

Sep. 27, 1985 [JP] Japan ........ 60-212703
Oct. 31, 1985 [JP] Japan ........ 60-242868
Oct. 31, 1985 [JP] Japan ........ 60-242869

[51] Int. Cl.$^4$ ........ G01D 15/16

[52] U.S. Cl. ........ 346/140 R; 219/543; 338/308; 338/314; 338/333; 346/1.1

[58] Field of Search ........ 346/140, 1.1, 76 PH; 338/308, 309, 314, 333, 324; 219/543

[56] References Cited

U.S. PATENT DOCUMENTS 4,313,124 1/1982 Hara ........ 346/140
4,602,261 7/1986 Matsuda ........ 346/140

*Primary Examiner*—Joseph W. Hartary
*Attorney, Agent, or Firm*—Fitzpatrick, Cella, Harper & Scinto

[57] ABSTRACT

A planar heat generating resistor has a heat generating resistor layer formed on or above a support member and a pair of opposing electrodes formed on the heat generating resistor layer, such that a width of the heat generating layer at the electrode area is larger than a width of the electrodes and a voltage is applied across the electrodes, in which a ratio of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor is no larger than 1.4 when a Laplace equation $\partial^2/\partial x^2+\partial^2\phi/\partial y^2=0$ is solved for the heat generating resistor when an orthogonal coordinate system X-Y is defined on the resistor surface, a potential at a point (x,y) on the resistor surface is represented by $\phi(x,y)$, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes.

10 Claims, 27 Drawing Figures

HEAT GENERATING RESISTOR, RECORDING HEAD USING SUCH RESISTOR AND DRIVE METHOD THEREFOR

BACKGROUND OF THE INVENTION

1. Field of the Invention

The present invention relates to a heat generating resistor, and more particularly to a heat generating resistor suitable for a recording head such as a liquid jet head which jets recording liquid by applying thermal energy to the recording liquid or a thermal head, a liquid jet recording head using such a heat generating resistor, and a drive method therefor.

2. Related Background Art

In a recording head such as a liquid jet recording head which jets recording liquid by applying thermal energy to the recording liquid by using a heat generating resistor or a thermal head which prints characters by applying thermal energy to a transfer ribbon or thermo-sensitive paper by using the heat generating resistor, it is important to lengthen the lifetime of the heat generating element. In part, damage to the heat generating resistor is, in many cases, due to nonuniform heat generation in the heat generating resistor which serves as a heater.

It has been proposed in a heat generating resistor having a conductive electrode layer formed on a heat generating resistive layer to widen the heat generating resistive layer on which the electrode is formed wide than a width of the electrode in order to prevent the electrode from being broken when the electrode is formed and increase step coverage of a protective layer to enhance durability. (See Japanese Patent Application Laid-Open No. 194589/1984). However, in the heat generating resistor of such a shape, a density of a current flowing across the electrodes is not uniform but concentrates to a certain point. As a result, the heat generation is not uniform but the heat generation is large at a certain area of the heat generating resistor. Damage arises from the large heat generation area and the lifetime of the resistor is shortened consequently.

In the present invention, a relationship between the width of the heat generating resistor and the width of the electrode is considered where the former is larger than the latter.

Problems encountered in the prior art will be explained in connection with a liquid jet recording head which uses a liquid jet recording method to jet liquid by utilizing a thermal energy.

A liquid jet recording method for the liquid jet recording head disclosed in DOLS 2843064 is characterized over other liquid jet recording methods in that it applies thermal energy to liquid to produce a motive force to discharge droplets. In the disclosed method, the liquid acted on by the thermal energy is overheated to generate bubbles, and the liquid is discharged from an orifice at an end of the recording head by an action of the bubble generation so that flying droplets are formed, and the droplets are deposited to a recording medium to record information.

The recording head used in this recording method usually comprises a liquid discharge unit having an orifice from which liquid is discharged and a liquid flow path including a heat action area which communicates with the orifice and by which thermal energy for discharging droplets act on the liquid, and a heat generating resistor or heat generation unit for generating the thermal energy.

A shape of the heat generating resistor as shown in FIG. 1 has been proposed. Requirements to define such a shape are as follows. It is defined by a ratio of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the heat generating resistor area when an orthogonal coordinate system X-Y is defined on a surface of the heat generating resistor 3, $\phi(x,y)$ is defined as a potential at a point (x,y) on the surface of the resistor, a certain boundary value is imparted to an area of a circumferential boundary of the resistor which contacts to one electrode 4, and a different boundary value is imparted to an area which contacts to the other electrode 4, a boundary condition in which a differential coefficient of $\phi$ to a normal direction of the circumferential boundary is zero is imparted to an area which does not contact to any of the electrodes.

For example, the ratio in the prior art resistor shown in FIG. 1 is mathematically infinite.

The above heat generating resistor has a pair of electrodes which are usually a selection electrode and a common electrode. A voltage is applied across the electrodes so that thermal energy for discharging droplets from the orifice is generated from the heat generating resistor. One of the major factors to determine a repetitive usage lifetime (durability) of the liquid jet recording head is a mechanical impact force called a cavitation destruction which is generated when vapor bubbles extinguish by self-contraction more specifically, the cavitation destruction occurs as the liquid near the heat generating resistor is overheated by abrupt heat generation by the heat generating resistor and it reaches an overheat limit temperature of the liquid and vapor bubbles are generated, and the liquid is discharged from the orifice by rapid volume increase and flying droplets are formed. As the bubbles (vapor bubbles) extinguish by self-contraction, the cavitation destruction occurs. The impact to the heat generating resistor by the cavitation destruction has been a factor to determine the durability of the recording head.

Several approaches to improve the durability of the recording head by avoiding the above problem have been known. For example, the heat generating resistor is made of a high anti-cavitation property, or a protection layer having the high anti-cavitation property is provided between the heat generating resistor and the recording liquid, or the liquid flow path is structured to weaken the impact force by the cavitation destruction. The durability of the recording head has been improved by those approaches.

In a dot print type liquid jet recording head which utilizes thermal energy and in which the heat generating resistor is laminated on a substrate of a liquid path which communicates with the orifice and the liquid is heated by supplying a pulse to the heat generating resistor, it is important for the improvement of image quality to effectively apply thermal energy to the liquid for each pulse and stably discharge the liquid when the head is repeatedly driven.

It has been known that the above object is attained by laminating on the substrate a lower layer having a thermal conductivity $k_2$, a specific heat $c_2$, a density $\rho_2$ and a thickness $L_2$, a heat generating resistor layer having a thermal conductivity $k_H$ and a thickness $L_H$, and an upper layer having a thermal conductivity $k_1$, a specific heat $c_1$, a density $\rho_1$ and a thickness $L_1$, in this order with materials and dimension being selected to meet relationships of $$\sqrt{\frac{k_2}{c_2\rho_2}}\ \tau \leqq L \leqq A - B \quad (1)$$

$$L_1 < \sqrt{\frac{k_2c_2\rho_2}{k_1c_1\rho_1}}\ L_2 \quad (2)$$

where $L = L_1 + L_H + L_2$ $$A = \frac{S_t}{Q}\cdot\Delta T\left(\frac{k_1\beta_2 + k_2\beta_1}{\beta_1 + \beta_2}\right)$$

$$B = \frac{k_2L_H}{k_H}$$

$$\beta_1 = \sqrt{c_1\rho_1k_1}$$

$$\beta_2 = \sqrt{c_2\rho_2k_2}$$

$\tau$: half-value width of an electrical signal applied to the heat generating resistor t: time between input of one electrical signal and input of the next electrical signal S: area of thermal action surface on a surface of the upper layer facing the thermal action area $\Delta T$: mean value of differences between surface temperatures of the thermal action surface and temperatures of surface of the lower layer facing the substrate Q: heat generated by one electrical signal In order to meet a requirement of higher durability, there still remains a problem even if the above formulas are met.

SUMMARY OF THE INVENTION

It is an object of the present invention to make a heat distribution of a heat generating resistor as uniform as possible and extend a life of the heat generating resistor.

It is another object of the present invention to provide a liquid jet recording head having higher durability and higher recording quality than those of a prior art liquid jet recording head.

It is another object of the present invention to provide a drive method for driving a liquid jet recording head by changing a reference of a drive voltage to the recording head from a conventional boundary voltage Vth so that an applied voltage Vop optimum from standpoints of durability and practicability is set.

It is another object of the present invention to provide a planar heat generating resistor which has a heat generating resistor layer formed on or above a support member and a pair of opposing electrodes formed on the heat generating resistor layer and in which a width of the heat generating layer at the electrode area is larger than a width of the electrodes and a voltage is applied across the electrodes, and in which a ratio of a maximum value of a gradient of $\phi$, $\sqrt{(\partial\phi/\partial x)^2+(\partial\phi/\partial y)^2}$ to a value of $\sqrt{(\partial\phi/\partial x^2+(\partial\phi/\partial y)^2}$ at a center of the resistor is no larger than 1.4 when a Laplace equation $\partial^2\phi/\partial x^2+\partial\phi/\partial y^2=0$ is solved for the heat generating resistor when an orthogonal coordinate system X-Y is defined on the resistor surface, a potential at a point (x,y) on the resistor surface is represented by $\phi(x,y)$, a boundary value is imparted to an area of a circumferential boundary of the resistor which contacts to one of the electrodes, a different boundary value is imparted to an area which contacts to the other electrode, a boundary condition in which a differential coefficient of $\phi$ to a normal direction of the circumferential boundary is zero is imparted to an area which does not contact to any of the electrodes.

It is another object of the present invention to provide a liquid jet recording head comprising an orifice for discharging liquid, a liquid flow path communicating with the orifice, a heat generating resistor arranged in the liquid flow path for generating thermal energy to discharge the liquid, the heat generating resistor including a heat generating resistor layer formed on or above a support member and a pair of opposing electrodes formed on the heat generating resistor layer, a width of the heat generating resistor layer at an electrode area being larger than a width of the electrodes, a voltage being applied across the electrodes, the heat generating resistor having a ratio of no larger than 1.4 of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the heat generating resistor area when an orthogonal coordinate system X-Y is defined on a surface of the resistor, a potential at a point (x,y) on the resistor surface is represented by $\phi(x,y)$, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is imparted to an area which does not contact to any of the electrode.

It is another object of the present invention to provide a liquid jet recording head having a heat acting area communicating with an orifice for discharging liquid for forming bubbles in the liquid by applying thermal energy to the liquid, and a heat generating resistor for generating the thermal energy, the heat generating resistor including a heat generating resistor layer formed on a lower layer formed on or above a support member and a pair of opposing electrodes formed on the heat generating resistor layer, a width of the heat generating resistor at an electrode area being larger than a width of the electrodes, a voltage being applied across the electrodes, an upper layer being formed on the heat generating resistor, the heat generating resistor having a ratio of no larger than 1.8 of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the area of the heat generating resistor when an orthogonal coordinate X-Y is defined on a surface of the heating generating resistor, $\phi(x,y)$ is defined as a potential at a point (x,y) on the surface of the resistor, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes, and the heat generating resistor meeting the following condition $$\int_0^L \sqrt{\frac{c(x)\rho(x)}{k(x)}}\,dx < 2\sqrt{\tau_B}$$

where k(x) is a thermal conductivity of a material at a position x measured in the direction of the lower layer from the boundary of the layer and the support member to the heat acting area, c(x) is a specific heat, $\rho(x)$ is a density, L is a total thickness from the boundary of the lower layer and the support member of the heat generating resistor and $\tau_B$ is a time from start of application of the heat energy to extinguishment of the bubbles.

It is another object of the present invention to provide a method for driving a liquid jet recording head having a heat acting area communicating with an orifice for discharging liquid for imparting thermal energy to the liquid and a heat generating resistor for generating the thermal energy, the heat generating resistor including a heat generating resistor layer formed on or above a support member and a pair of opposing electrodes formed on the heat generating resistor layer, a width of the heat generating resistor layer in an electrode area being larger than a width of the electrodes, a voltage being applied across the electrodes, the heat generating resistor having a ratio of no larger than 1.8 of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the area of the heat generating resistor when an orthogonal coordinate system x-y is defined on the surface of the heat generating resistor, $\phi(x,y)$ is defined as a potential at a point (x,y) on the surface of the heat generating resistor, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes, the applied voltage Vop to the heat generating resistor being selected to meet a relationship of $1.15 \geqq Vop/V_R$ where $V_R$ is a minimum applied voltage to the heat generating resistor at which bubbles (secondary bubbles) other than the bubbles for discharging the liquid are generated at the heat acting area.

DETAILED DESCRIPTION OF THE PREFERRED EMBODIMENTS

Embodiment 1

Figure 6A:
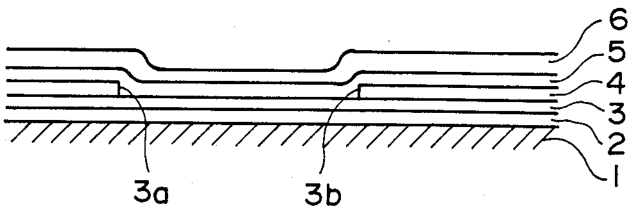
FIGS. 6A to 16 illustrate the present invention.
Figure 6B:
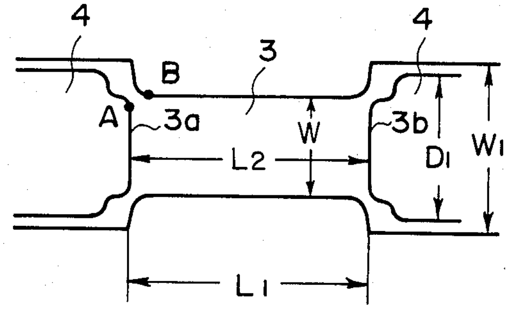
Figure 6C:
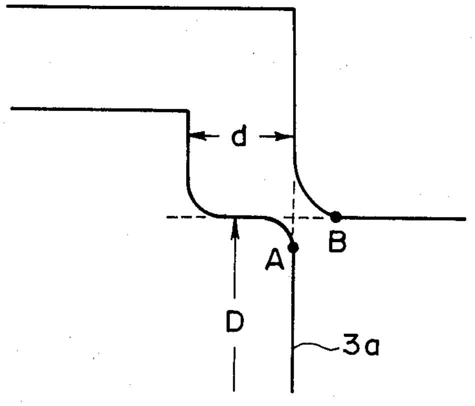

FIGS. 6A to 6C illustrate one embodiment of the present invention, which show the neighbourhood of a heat generating resistor of a head which discharges droplets by generating bubbles in recording liquid by applying thermal energy to the heat generating resistor.

Numeral 1 denotes a support member, numeral 2 denotes a heat accumulation layer, numeral 3 denotes a heat generating resistor, numeral 4 denotes an electrode and numerals 5 and 6 denote protective layers. Materials and thicknesses of the respective layers are shown in Table 1. FIG. 6A shows a schematic cross sectional view, FIG. 6B shows a schematic plan view with the protective layers 5 and 6 being removed, and FIG. 6C shows an enlarged schematic view of neighbourhood of A and B in FIG. 6B. W is a width of the resistor 3 at a center of the resistor, $W_1$ is a width of the resistor at an end thereof, D is a width of the electrode 4 at an end thereof, $D_1$ is a width of the electrode 4 at the end of the resistor, $L_1$ is a distance between two steps in the width of the resistor and $L_2$ is a distance between electrode ends. In the present embodiment, W=32 μm, $W_1$=58 μm, D=32 μm, $D_1$=50 μm, $L_1$=150 μm and $L_2$=150 μm, and the width D of the electrode at the end thereof is essentially equal to the width W of the resistor at the center thereof, the end positions of the electrodes coincide with the step positions of the resister, and the curved areas of the resistor have a relatively large radius of curvature. In FIG. 6C, d=8 μm and the radius of curvature of the curved area is approximately D/10.

In FIG. 6B, an orthogonal coordinate system x-y is defined on a surface of the heat generating resistor, a potential at a point (x,y) on the surface of the resistor is represented by $\phi(x,y)$, a boundary value $\phi_1$ is imparted to an edge *3a* which contacts to one of the electrodes, a boundary value $\phi_2$ different from $\phi_1$ is imparted to an edge *3b* which contacts to the other electrodes, a boundary condition in which a differential coefficient of $\phi$ to a normal direction of a circumferential boundary is zero is imparted to an area which does not contact to any of the electrodes and a Laplace equation for unknown factor $\phi$ is solved for the area of the heat generating resistor. A gradient of $\phi$ is maximum at a point B and it is 1.13 times as large as the gradient of $\phi$ at a center of the resistor.

So long as the orthogonal coordinate system x-y is on the surface of the resistor, the position at which the gradient of $\phi$ is maximum and a ratio of the gradient of $\phi$ at the maximum position to the gradient of $\phi$ at the center of the resistor are constant whatever the origin point of the coordinate and the directions of x-y are selected or whatever the boundary values $\phi_1$ and $\phi_2$ are changed.

Embodiments 2-6

In Embodiments 2-6, D and $L_2$ in FIG. 6 are changed, and ratios $\gamma$ of the maximum gradients of $\phi$ to the gradients at the center of the resistors in the Embodiments 2-6 as well as the Embodiment 1 are shown in Table 2. In the range of dimensions shown in Table 2, the ratios $\gamma$ are no larger than 1.4. The position at which the gradient of $\phi$ is maximum is the edge A at which the resistor 3 contacts to the electrode 4, or the edge B of a parallel section of the resistor 3, depending on the shape of the heat generating resistor. The ratio $\gamma$ of the gradient of $\phi$ at that position to the gradient of $\phi$ at the center of the resistor varies with the shape of the heat generating resistor.

Embodiment 7

Figure 7A:
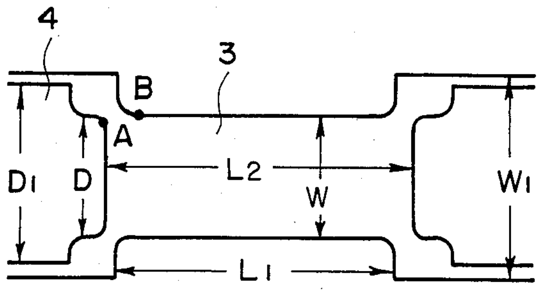
Figure 7B:
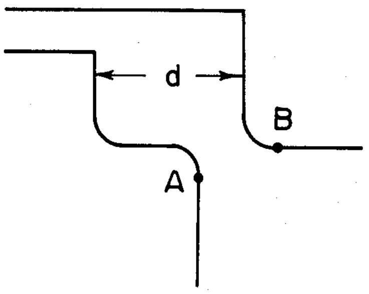

FIGS. 7A and 7B show another embodiment of the present invention. A schematic cross sectional view is similar to that shown in FIG. 6A. FIG. 7A shows a schematic plan view with protective layers 5 and 6 being removed, and FIG. 7B shows an enlarged schematic view of neighbourhood of A and B in FIG. 7A. In the present embodiment, W=32 μm, $W_1$=58 μm, D=32 μm, $D_1$=50 μm, $L_1$=150 μm, $L_2$=158 μm and d=13 μm, and $L_2 > L_1$. In the present embodiment, a position at which a gradient of $\phi$ is maximum is B and $\gamma$=1.36 which is no larger than 1.4.

Comparative Example 1

Figure 2A:
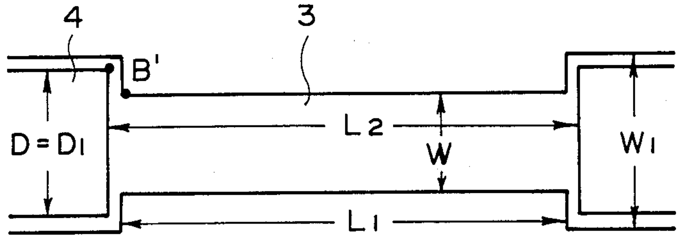
FIG. 2A PRIOR ART
FIGS. 2 to 5B illustrate comparative examples of the present invention.
Figure 2B:
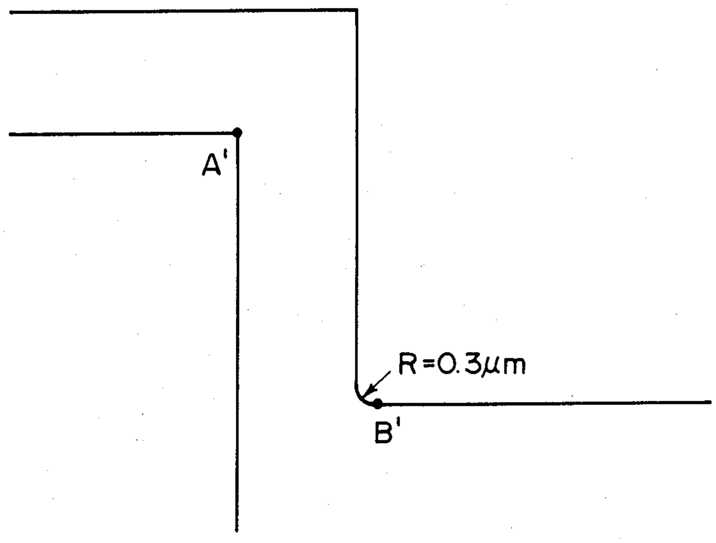
FIG. 2B PRIOR ART

Advantages of the present invention described in Embodiments 1 to 7 are shown below. FIG. 2 shows a heat generating resistor of a conventional shape shown for comparison. A schematic cross sectional view is similar to that shown in FIG. 6A, FIG. 2A shows a schematic plan view with protective layers 5 and 6 being removed, and FIG. 2B shows an enlarged schematic view of a neighbourhood of A' and B' in FIG. 2A, In FIG. 2, $L_1$=150 μm, $L_2$=158 μm, W=32 μm, $W_1$=58 μm and D=$D_1$=50 μm. In this comparative example, a radius of curvature of a corner of the resistor is small and a width W of the resistor is smaller than a width D of the electrode. In this comparative example, a position at which a gradient of $\phi$ is maximum is B' and $\gamma$=1.71.

Table 3 shows results of durability tests of heat generating resistors of the Embodiments 1-7 shown in FIG. 6, Table 2 and FIG. 7 and the comparative example 1 shown in FIG. 2. A minimum voltage required to jet liquid is measured for each resistor and 1.15 is multiplied by the minimum voltage to determine a voltage to be applied to the heat generating resistor. A pulse width is 8 μsec and a pulse frequency is 1 KHZ.

As seen from Table 3, the smaller $\gamma$ is, the higher is the durability of the resistor, and when $\gamma$ exceeds 1.36, the durability abruptly changes.

TABLE 1

| Layer | Material | | Thickness (in μm) |
|---|---|---|---|
| Substrate | Silicon | Si | 550 |
| Heat Accumulation Layer | Silicon dioxide | $SiO_2$ | 5.0 |
| Heat Generating Resistor | Hafnium boride | $HfB_2$ | 0.15 |
| Electrode | Aluminum | Al | 0.55 |
| Protective Layer | Silicon dioxide | $SiO_2$ | 1.90 |
| Protective Layer | Tantalum | Ta | 0.55 |

TABLE 2

| | Emb. 1 | Emb. 2 | Emb. 3 | Emb. 4 | Emb. 5 | Emb. 6 |
|---|---|---|---|---|---|---|
| D (μm) | 32 | 30 | 28 | 36 | 32 | 32 |
| L (μm) | 150 | 150 | 150 | 150 | 146 | 154 |
| $\gamma$ | 1.13 | 1.19 | 1.28 | 1.18 | 1.19 | 1.28 |
| Maximum $\phi$ gradient Point | B | A | A | B | A | B |

TABLE 3

| | $\gamma$ | Number of pulses applied before resistor is broken |
|---|---|---|
| Emb. 1 | 1.13 | $1.1 \times 10^{10}$ |
| Emb. 2 | 1.19 | $7.9 \times 10^9$ |
| Emb. 3 | 1.28 | $5.4 \times 10^9$ |
| Emb. 4 | 1.18 | $7.2 \times 10^9$ |
| Emb. 5 | 1.19 | $6.9 \times 10^9$ |
| Emb. 6 | 1.28 | $6.0 \times 10^9$ |
| Emb. 7 | 1.36 | $4.7 \times 10^9$ |

TABLE 3-continued

| | $\gamma$ | Number of pulses applied before resistor is broken |
|---|---|---|
| Comp. 1 | 1.71 | $8.4 \times 10^8$ |

Embodiment 8

Figure 8A:
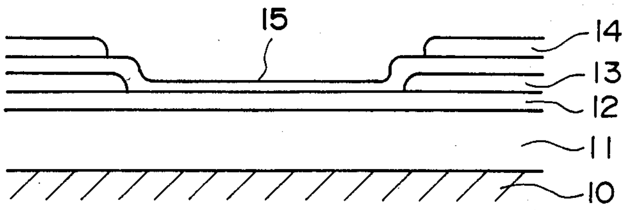
Figure 8B:
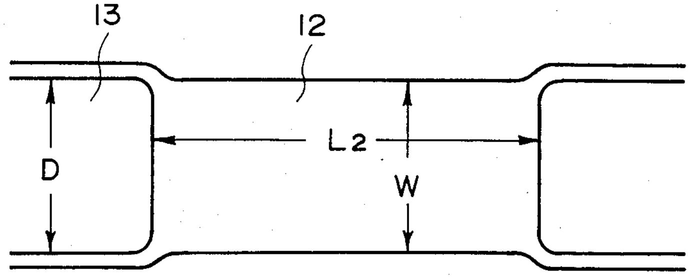
Figure 8C:
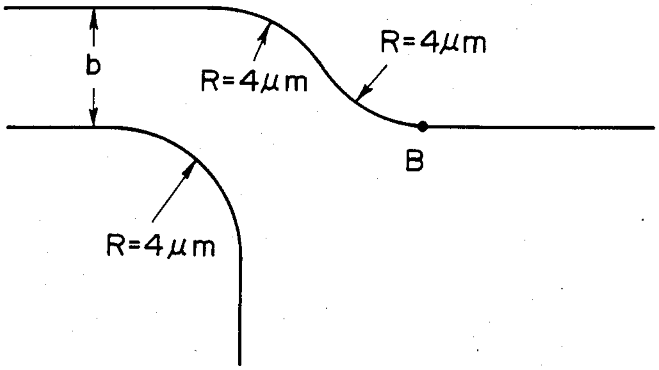

FIGS. 8A to 8C show another embodiment of the present invention. They show the neighbourhood of a heat generating resistor of a head which discharges droplets by generating bubbles in recording liquid by applying thermal energy to the heat generating resistor. A film structure is different from the embodiments described above. FIG. 8A shows the layer structure of the present embodiment in which numeral 10 denotes a support member, numeral 11 denotes a heat accumulation layer, numeral 12 denotes a heat generating resistor layer, numeral 13 denotes an electrode, and numerals 14 and 15 denote protective layers. Materials and thicknesses of the respective layers are shown in Table 4. FIG. 8B shows a shape of the resistor, and FIG. 8C shows an enlarged schematic view of an upper left portion of FIG. 8B. A radius of curvature of a curved portion of the resistor is slightly larger than that in FIG. 6, and a width D of the electrode is equal to $D_1$. In the present embodiment, a position at which a gradient of $\phi$ is maximum is B, and $\gamma$ is 1.25.

Embodiment 9

Figure 9A:
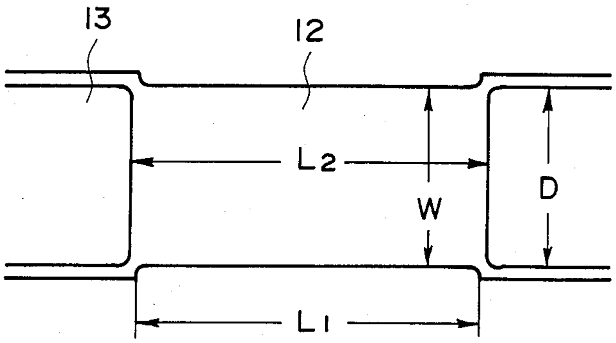
Figure 9B:
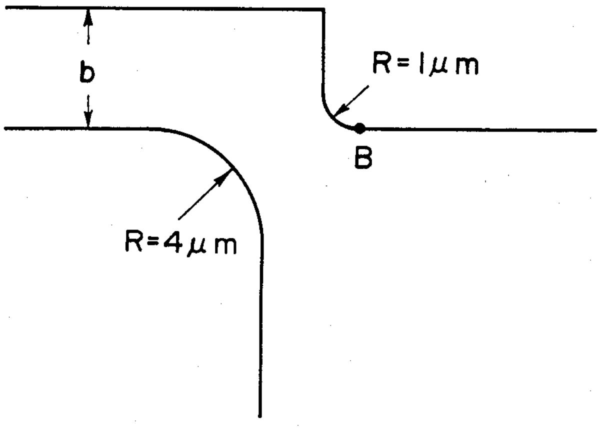

FIGS. 9A and 9B show other embodiment having a different shape of resistor. The film structure is same as that of FIG. 8. FIG. 9A shows a shape of the resistor and FIG. 9B shows an enlarged schematic view of an upper left portion of FIG. 9A. In the present embodiment, a position at which a gradient of $\phi$ is maximum is B, and $\gamma$ is 1.40.

COMPARATIVE EXAMPLE 2

Figure 3A:
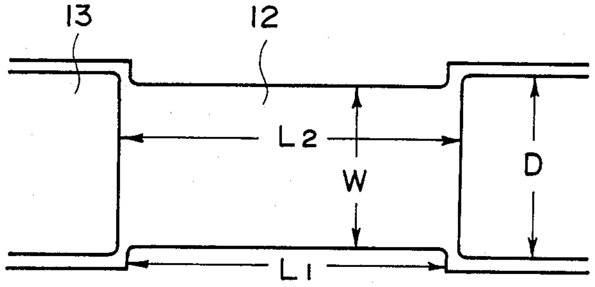
F I G. 3A PRIOR ART
Figure 3B:
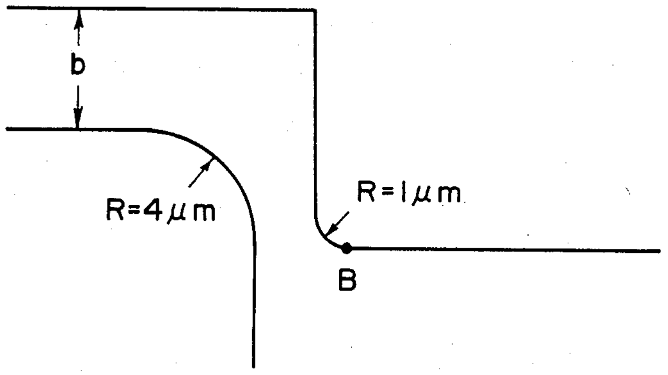
F I G. 3B PRIOR ART

FIGS. 3A and 3B show a comparative example. The film structure is same as that of FIG. 4. FIG. 3A shows a shape of a resistor and FIG. 3B shows an enlarged schematic view of an upper left portion of FIG. 3A. In this example, a position at which a gradient of $\phi$ is maximum is B', and $\gamma$ is 1.55. Dimensions in the Embodiments 8 and 9 are shown in Table 5. In the comparative example 2, W=52 μm and other dimensions are equal to those in Table 5.

Durability tests were conducted for the Embodiments 8 and 9 shown in FIGS. 4 to 6B and the Comparative Example 2 in the same manner as that of the Embodiments 1-7 and the comparative Example 1. The results are shown in Table 6. As seen from Table 6, the value $\gamma$ governs the durability, and when $\gamma$ exceeds 1.4, the durability abruptly changes. In spite of the fact that the film structures of those three Embodiments 8, 9 and Comparative Example 2 are different from those of the above Embodiments and the Comparative Example 1, it is seen than the value $\gamma$ strongly governs the durability. In accordance with the present invention, the durability is improved for a severer film structure.

Materials of the heat generating resistor as well as other layers are not restricted to those shown in Tables 1 and 4 but may be appropriately selected. While the resistor of the liquid jet recording head has been shown in the above embodiments, the heat generating resistor of the present invention can be widely applied to a heat generating resistor of a thermal head or other planar heat generating resistor.

In the present invention, the thickness of the heat generating resistor layer may be within a range of a conventional heat generating resistor. A distribution of the thickness is preferably within ±5% of a mean thickness.

TABLE 4

| Layer | Material | | Thickness (in μm) |
|---|---|---|---|
| Substrate | Glass | | 550 |
| Heat Accumulation Layer | Silicon dioxide | $SiO_2$ | 2.5 |
| Heat Generating Layer | Tantalum | Ta | 0.15 |
| Electrode | Aluminum | Al | 0.55 |
| Resistor Protective Layer | Polyimid | | 2.5 |
| Electrode Protective Layer | Silicon dioxide | $SiO_2$ | 0.4 |

TABLE 5

| | |
|---|---|
| W | 60/μm |
| D | 60 μm |
| $L_1$ | 116 μm |
| $L_2$ | 120 μm |
| b | 4 μm |

TABLE 6

| | γ | Number of pulses applied before resistor is broken |
|---|---|---|
| Emb. 8 | 1.25 | $6.2 \times 10^8$ |
| Emb. 9 | 1.40 | $4.8 \times 10^8$ |
| Comp. 2 | 1.55 | $6.4 \times 10^7$ |

As described above, the uniform heat distribution of the heat generating resistor is attained and the highly durable resistor is provided by determining the shape of the heat generating resistor such that the ratio of the maximum value of the gradient of φ, $\sqrt{(\partial\phi/\partial x)^2+(\partial\phi/\partial y)^2}$ to a value of $\sqrt{(\partial\phi/\partial x)^2+(\partial\phi/\partial y)^2}$ at the center of the resistor is no larger than 1.4 when the Laplace equation $\partial^2\phi/\partial x^2+\partial^2\phi/\partial y^2=0$ is solved for the heat generating resistor area when the orthogonal coordinate system x-y is defined on the surface of the heat generating resistor, the potential at the point (x,y) on the surface of the resistor is represented by φ(x,y), a boundary value is imparted to an area of the circumferential boundary of the resistor which contacts to one of the electrodes, a different boundary value is imparted to an area which contacts to the other electrode, and the boundary condition in which the differential coefficient of φ to the normal direction of the boundary is zero is imparted to an area which does not contact to any of the electrodes.

More specifically, it is necessary that the shape of the heat generating resistor has no corner. Namely, it is necessary that the shape of the electrode or the heat generating resistor layer has no corner but has a substantial radius of curvature. The radius of curvature cannot be uniformly defined but, for A' and B' of FIG. 2A, it is at least several μm to ten and several μm. Generally, it is preferably larger than 5 μm.

When the Laplace equation is solved, the area of the heat generating resistor defined by a line which passes through a point space from the heat generating end of the electrode inwardly of the electrode by a length equal to the width of the heat generating resistor layer between the electrodes and which is normal to the heat generating resistor layer, by the electrode and by the heat generating resistor layer may be considered to approximate the ratio. The ratio calculated in this manner and the ratio calculated for the entire shape of the heat generating resistor showed no substantial difference therebetween.

When the ratio of the maximum value of the gradient of φ to the value of gradient of φ at the center of the resistor is larger than 1.4, a recording head having a sufficiently high durability may be provided by appropriately selecting the drive voltage and the film structure of the heat generating resistor.

If the ratio is smaller than the predetermined value, current concentration at the four corners of the heat generating resistor is smaller than that of the conventional resistor (infinite), and bubbles are not initially generated at the four corners but generated from the entire surface of the heat generating resistor. As a result, stable bubbles are generated. More specifically, when the discharge frequency is below 10 KHz, a change of volume of main bubbles (bubbles generated to discharge the liquid) for each discharge is small and hence a change of volume of discharged droplets is small. Thus, stable discharging is attained and print quality is improved.

However, if the ratio is too large, a sufficiently high durability is not attained depending on an electrical drive condition to the heat generating resistor, because, when vapor bubbles generated by applying an electrical signal to the heat generating resistor self-contract, strip-like secondary bubbles remain along the flow of the liquid at positions of higher temperature than an over-heat critical temperature if such positions exist other than positions at which the vapor bubbles extinguish.

The main bubbles generated to discharge the liquid are collapsed by a force in the direction of the liquid flow or the liquid flow path but the secondary bubbles which remain after the extinguishment of the main bubbles are in the vicinity of the heat acting surface and they are not subjected to the force in the direction of the liquid flow because the height of the bubbles is low. Accordingly, they are collapsed perpendicularly to the direction of the liquid flow in the liquid flow path.

The cavitation of the bubbles collapsed perpendicularly to the liquid flow path is very large and locally concentrates. It is several tens times as large as the cavitation by the extinguishment of the main bubbles. As a result, the top protective layer of the thermal acting surface is broken by the cavitation collapse of the bubbles and the heat generating resistor is broken and the durability thereof is reduced.

Figure 10:
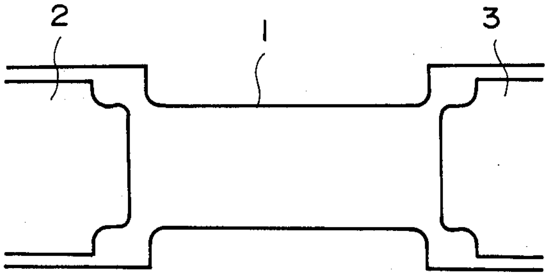

It has been proposed in DOLS 3224061 to set a drive voltage $V_{op}$ to no larger than 1.3 times of a threshold voltage Vth at which the vapor bubbles are generated in order to prevent the secondary bubbles. However, in the head having the heat generating resistor of the shape shown in FIG. 10, there is no generation of bubbles at the four corners and the threshold voltage Vth may not be uniform even if the film structures are same. Accordingly, even if the drive voltage $V_{op}$ is set to 1.3 times of the threshold voltage Vth, the durability is reduced by the generation of the secondary bubbles.

In the past, the film structure was determined by the formulas (1) and (2) shown in U.S. Pat. No. 4,313,124. However, in the proposed shape shown in FIG. 10, the bubbles are not initially generated from the four corners of the heat generating resistor and the heat required to generate the bubbles is different from that in the conventional resistor. As a result, if the film structure represented by the formulas of U.S. Pat. No. 4,313,124 is adopted, the heat is accumulated and the durability is reduced or the generation of the bubbles becomes unstable.

The formulas (1) and (2) determine a condition that the temperature of the recording head does not rise when the lower layer acts as a barrier to the heat transfer to the substrate during heating by the pulse energization and the heat is transferred from the heat acting area to the liquid through the upper layer to repeatedly drive the recording head.

Accordingly, in the liquid jet recording head which meets the formulas (1) and (2), the heat transfer to the liquid for each pulse and the temperature condition of the recording head after application of a number of pulses raise no problem, but if there are high temperature points higher than the critical heating temperature other than positions at which the vapor bubbles extinguish, stripe-like secondary bubbles remain at those points along the direction of the liquid flow.

It has been found by the inventors of the present invention a recording head having a practically high durability is provided if the following conditions are met.

When the ratio is no larger than 1.8, the material and thickness of the heat generating resistor are selected to meet the following formula $$\int_{O}^{L}\sqrt{\frac{c(x)\rho(x)}{k(x)}}\,dx < 2\sqrt{\tau_B}$$

Where k(x) is a thermal conductivity of the material at a position x measured from the boundary of the lower layer and the substrate of the heat generating resistor which has the lower layer, heat generating resistor layer and upper layer laminated in this order on the substrate, toward the heat acting area along the direction of the thickness of the layers, c(x) is a specific heat, ρ(x) is a density, L is a total thickness of the heat generating resistor, and $\tau_B$ is a time from the start of application of the thermal energy to the extinguishment of the bubbles. As a result, a recording head having a high durability is provided. Alternatively, the applied voltage $V_{op}$ to the heat generating resistor is set to meet a relationship of $1.15 \geqq V_{op}/V_R$ where $V_R$ is a minimum value of the applied voltage at which bubbles (secondary bubbles) other than the main bubbles appear at the heat acting area. As a result, the recording head can be driven over an extended period without breakage. Those embodiments are now explained.

The liquid jet recording head having the material and thickness of the heat generating resistor selected in the manner described above has a high durability if it is constructed such that the temperature of the heat generating resistor is sufficiently lowered before the extinguishment of the bubbles even if the ratio is no larger than 1.8. When heat is transferred in a material having heat conductivity k, specific heat c and density ρ, a distance x through which the heat is transferred in a time t (distance through which a temperature distribution changes) is represented by $$x \approx 2\sqrt{\frac{kt}{c\rho}} \tag{3}$$

Accordingly, a condition that the heat dissipates before a time $t_B$ is $$\sqrt{\frac{c\rho}{k}}\,x < 2\sqrt{t_B} \tag{4}$$

The condition of the formula (4) is applied to the heat generating resistor so that the formula (4) is represented as $$\int_{O}^{L}\sqrt{\frac{c(x)\rho(x)}{k(x)}}\,dx < 2\sqrt{\tau_B} \tag{5}$$

where k(x) is a thermal conductivity at a position x of the heat generating resistor measured from the boundary of the lower layer and the support member, c(x) is a specific heat, ρ(x) is a density, L is a thickness of the heat generating resistor, that is, a sum of thicknesses of the lower layer, heat generating resistor layer and upper layer, $\tau_B$ is a lifetime of the bubbles, that is, a time from the generation of the bubbles to the extinguishment of the bubbles.

When the film of the heat generating resistor is structured to meet the formula (5), the heat dissipates from the heat generating resistor before the bubble extinguishment time $\tau_B$ and the temperature is sufficiently lowered. Thus, the problem of residual bubbles at the high temperature points or generation of secondary bubbles is solved, and the oxidization of the heat generating resistor by the adiabatic action of the bubbles and the cavitation at the extinguishment of the bubble are prevented. As a result, the practically sufficient durability is attained compared to the prior art liquid jet recording head.

The embodiments will be explained in further detail.

Embodiment 10

Figure 11:
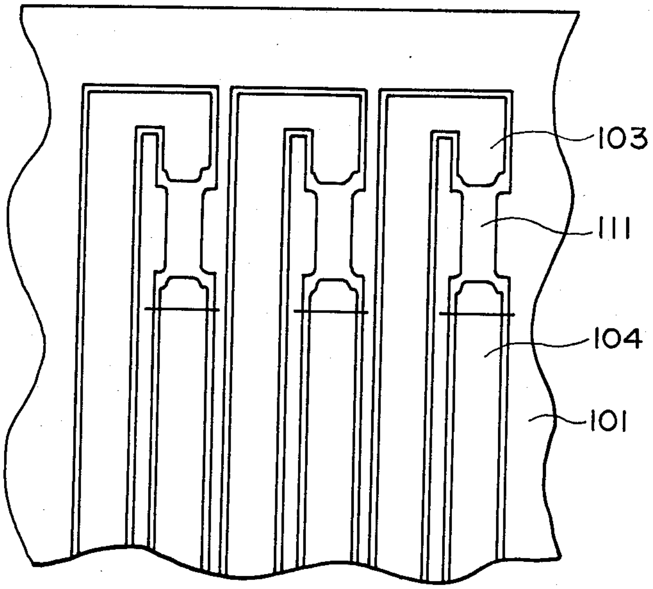
Figure 13A:
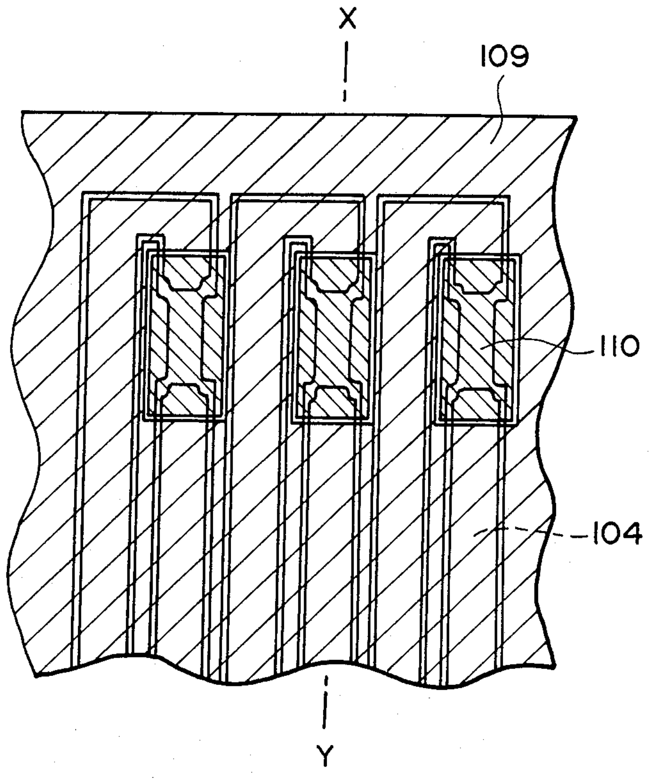
Figure 13B:
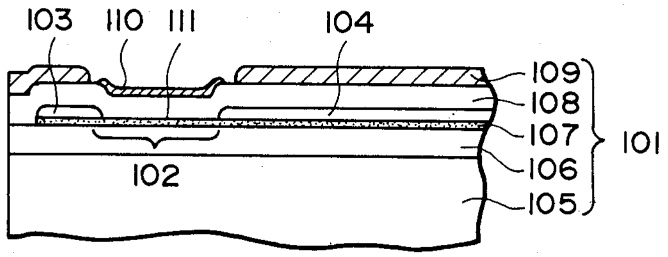
Figure 14:
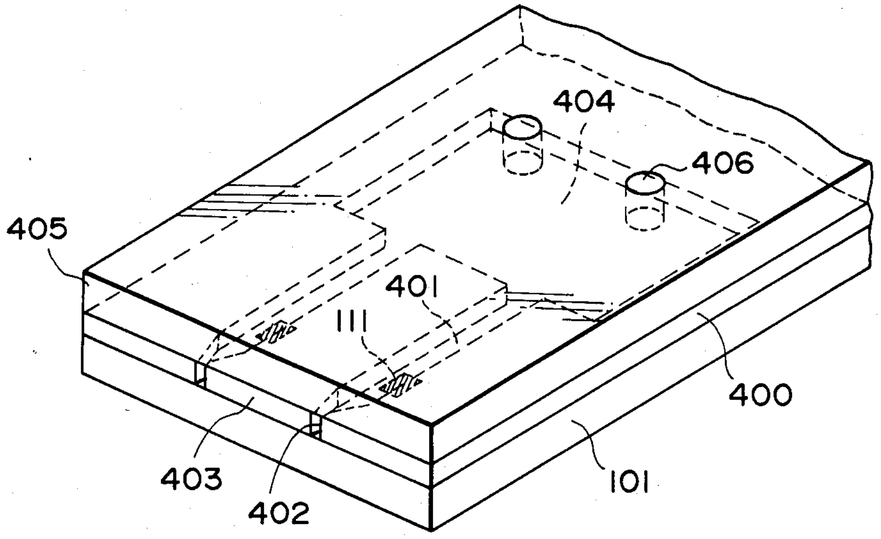

FIGS. 11 to 13 show a process of manufacturing a substrate of the Embodiment 10 and FIG. 14 shows a liquid jet recording head of the present embodiment. Numeral 101 denotes the substrate, numeral 102 denotes a heat generating area and numerals 103 and 104 denote electrodes.

The process of manufacturing the substrate of the heat generating resistor of the present embodiment is now explained. As shown in FIG. 12B, a $SiO_2$ film having a thickness of 2 μm is formed by thermal oxidization of a Si wafer which serves as a substrate support 105 to form a lower layer 106 of the substrate 101. A heat generating resistor layer 107 of $HfB_2$ having a thickness of 1300 Å is formed on the lower layer 106 by sputtering.

Then, Ti layer (50 Å) and Al layer (5000 Å) are continuously formed by electron beam vapor deposition to form a common electrode 103 and a selection electrode 104. A pattern shown in FIG. 11 is formed by photolithography. The heat acting surface of the heat generating area 102 of the heat generating unit 111 is 30 μm in width and 150 μm in length, and a resistor thereof including the Al electrodes 103 and 104 is 100 Ω.

Then, as shown in FIG. 12B, a first upper protective layer 108 is formed by sputtering $SiO_2$ to a thickness of 1.6 μm on the entire surface of the substrate 101 by magnetron type high rate sputtering method.

Figure 12A:
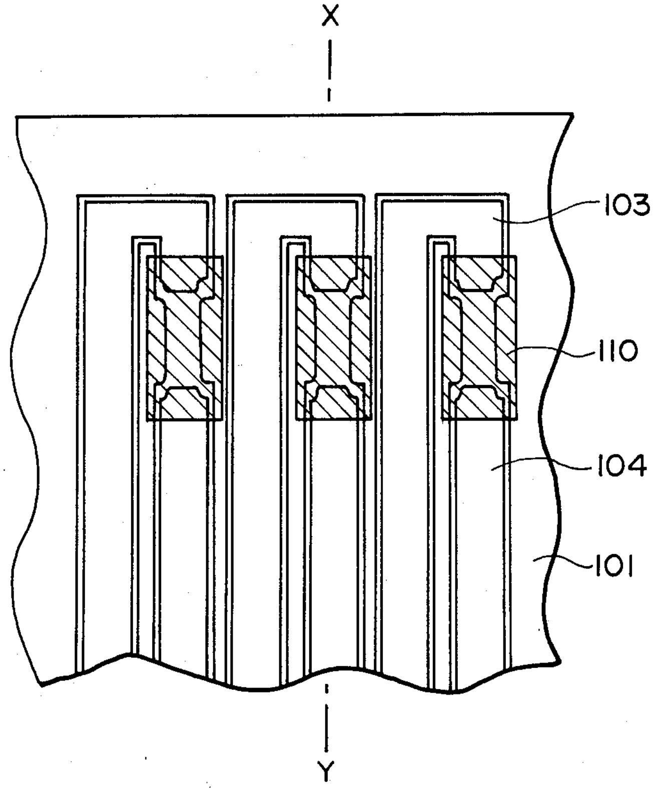
Figure 12B:
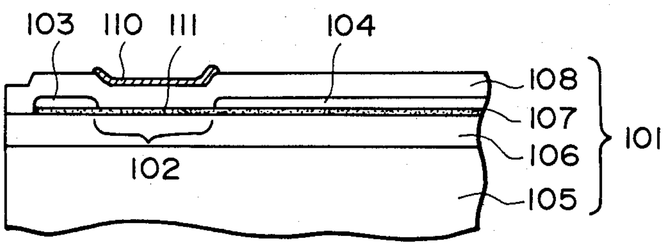

Then, as shown in FIGS. 12A and 12B, a second upper protective layer 110 is sputtered to a thickness of 0.55 μm by the magnetron type high rate sputtering method. Then, the second upper protective layer 110 is formed into a pattern to cover the top of the heat generating area 102 as shown in FIGS. 12A and 12B by the photolithography.

Then, as shown in FIGS. 13A and 13B, photosensitive polyimid (tradename Photoniece) is applied to the first upper protective layer 108 of the substrate 101 as a third upper protective layer 109, which is formed into a pattern shown in FIG. 13 by the photolithography.

As shown in FIG. 14, a photosensitive resin dry film 400 having a thickness of 50 μm is laminated on the substrate 101 and it is exposed to a light through a predetermined pattern mask to form a liquid flow path 401 and a common liquid chamber 404. A top plate 405 made of glass is bonded onto the film 400 by epoxy bonding material to form the liquid jet recording head. Numeral 402 denotes an orifice, numeral 403 denotes an ink flow path wall, and numeral 406 denotes an ink supply port.

As an example, the liquid flow path 401 has a width of 50 μm, a height of 50 μm and a length of 750 μm. A length from a front end of the heat generating area (heater) 111 to the orifice 402 is 150 μm.

The bubble entinguishment time of the liquid jet recording head of the present embodiment was 50 microseconds from the application of the pulse under a drive condition of a pulse width of 7 μs, a frequency of 2 KHz and a drive voltage which is 1.2 times of the bubble generation voltage. The value of the left term of the formula (5)

$$\int_0^L \sqrt{\frac{c(x)\rho(x)}{k(x)}}\,dx$$

of the liquid jet recording head is shown below when the values shown in Table 7 are placed.

$$\int_0^L \sqrt{\frac{c(x)\rho(x)}{k(x)}} = 2\times10^{-6}\sqrt{\frac{c(SiO2)\rho(SiO2)}{k(SiO2)}} + 0.13\times10^{-6}\sqrt{\frac{c(HfB2)\rho(HfB2)}{k(HfB2)}} + 0.55\times10^{-6}\sqrt{\frac{c(Ta)\rho(Ta)}{k(Ta)}} + 1.6\times10^{-6}\times\sqrt{\frac{c(SiO2)\rho(SiO2)}{k(SiO2)}} = 4.35\times10^{-3}$$

TABLE 7

| Material | Heat Conductivity k (W/m · k) | Heat Capacity C · P (J/m³ · k) |
|---|---|---|
| $SiO_2$ | 1.4 | $1.9\times10^6$ |
| $Al_2O_3$ | 21 | $3.1\times10^6$ |
| Ta | 57 | $2.5\times10^6$ |

TABLE 7-continued

| Material | Heat Conductivity k (W/m · k) | Heat Capacity C · P (J/m³ · k) |
|---|---|---|
| $HfB_2$ | 30 | $2.7\times10^6$ |

Since $\tau_B=50$ μsec$=50\times10^{-6}$ sec, a value of the right term of the formula (5) is given by $$2\times\sqrt{\tau_B} = \sqrt{2\times50\times10^{-6}} = 1.4\times10^{-2}$$

Accordingly, since $4.35\times10^{-3}<1.4\times10^{-2}$, $$\int_0^L \sqrt{\frac{c(x)\rho(x)}{k(x)}}\,dx < 2\sqrt{\tau_B}$$

is met, that is, the condition of the formula (5) is met.

The result of the durability test for the liquid jet recording heads of the present embodiment and other embodiments are shown in Table 8.

Embodiment 11

Figure 15:
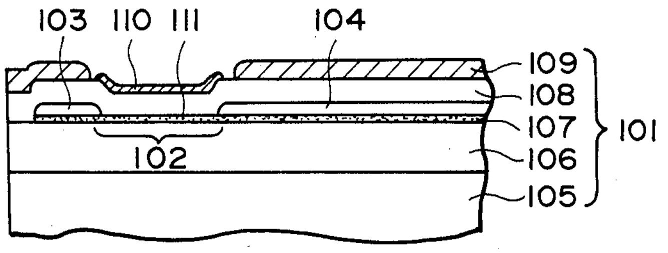

FIG. 15 shows a section of a substrate 101 formed by the Embodiment 11. In the present embodiment, an $Al_2O_3$ film having a thickness of 5 μm is formed on a substrate support member 105 of Si wafer by magnetron sputtering, and a $SiO_2$ film having a thickness of 1.9 μm is formed as a first upper protective layer by magnetron type high rate sputtering method. Other processes of manufacturing the substrate, the structure of the liquid jet recording head and the materials and dimensions thereof are same as those of the Embodiment 10.

The bubble extinguish time of the liquid jet recording head of the present embodiment, measured under the same condition as that of the Embodiment 10 is 50 μs from the application of the pulse. A value of the left term of the formula (5)

$$\int_0^L \sqrt{\frac{c(x)\rho(x)}{k(x)}}\,dx$$

for the liquid jet recording head is $4.29\times10^{-3}$, as calculated in the same manner as that of the Embodiment 10.

Since $\tau_B=50$ μs$=50\times10^{-6}$ sec, $$2\times\sqrt{\tau_B} = 1.4\times10^{-2}$$

Accordingly, since $4.29\times10^{-3}<1.4\times10^{-2}$, $$\int_0^L \sqrt{\frac{c(x)\rho(x)}{k(x)}}\,dx < 2\sqrt{\tau_B} \quad (5)$$

is met.

The result of the durability tests of the liquid jet recording heads of the present embodiment as well as other embodiments are shown in Table 8.

Embodiment 12

Figure 16:
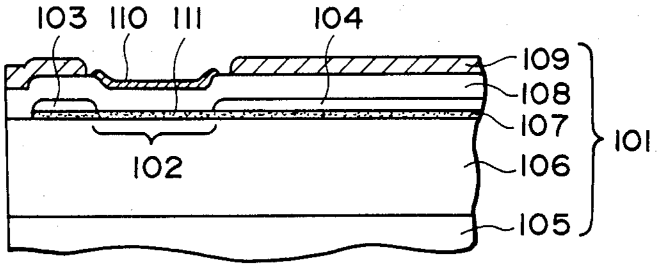

FIG. 16 shows a section of a substrate 101 formed by the Embodiment 12. In the present embodiment, a $SiO_2$ film having a thickness of 10 μm is formed on a substrate support member 105 of a Si wafer by thermal oxidization to form a lower layer 106 of the substrate 101. The other process for manufacturing the substrate, the structure of the liquid jet recording head and the materials and dimensions thereof are same as those of the Embodiment 10.

The bubble extinguish time of the liquid jet recording head of the present embodiment, measured under the same condition as that of the Embodiment 10 is 50 μs from the application of pulse. A value of the left term of the formula (5)

$$\int_O^L \sqrt{\frac{c(x)\rho(x)}{k(x)}}\, dx$$

for the liquid jet recording head is $1.37\times10^{-2}$ as calculated in the same manner as that of the Embodiment 10.

Since $\tau_B=50$ μsec$=50\times10^{-6}$ sec, the value of the right term of the formula (5) is $$2\times\sqrt{\tau_B} = 1.40\times10^{-2}$$

Accordingly, since $1.37\times10^{-2}<1.4\times10^{-2}$, $$\int_O^L \sqrt{\frac{c(x)\rho(x)}{k(x)}}\, dx < 2\sqrt{\tau_B} \quad (5)$$

is met.

The results of the durability tests for the liquid jet recording head of the present embodiment as well as other embodiments are shown in Table 8.

COMPARATIVE EXAMPLE 3

Figure 4:
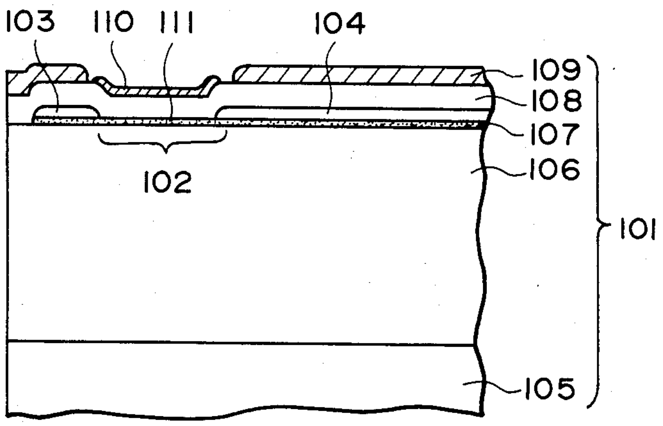
F I G. 4 PRIOR ART

For a purpose of comparison with the Embodiments 10–12, an example of a heat generating resistor of a liquid jet recording head which does not meet the condition of the formula (5) is shown in FIG. 4. In the Comparative Example 3, a $SiO_2$ film having a thickness of 15 μm is formed on a substrate support member 105 of a Si wafer by thermal oxidization to form a lower layer 106 of a substrate 101. A heat generating resistor layer 107 of made of $HfB_2$ having a thickness of 1500 Å is formed on the lower layer 106 by sputtering, and a $SiO_2$ film having a thickness of 2.5 μm is formed as a first upper protective layer 108 by magnetron type high rate sputtering method. The other process of manufacturing the substrate, the structure of the liquid jet recording head and the materials and dimensions thereof are same as those of the Embodiment 10.

The bubble extinguish time of the liquid jet recording head of the Comparative Example 3, measured under the same condition as that of the Embodiment 10 is 50 μs from the application of pulse. The value of the left term of the formula (5)

$$\int_O^L \sqrt{\frac{c(x)\rho(x)}{k(x)}}\, dx$$

for the liquid jet recording head is $2.0\times10^{-2}$, as calculated in the same manner as that of the Embodiment 10.

Since $\tau_B=50$ μsec$=50\times10^{-6}$ sec, $$2\times\sqrt{\tau_B} = 1.4\times10^{-2}$$

Accordingly, since $2.0\times10^{-2}<1.4\times10^{-2}$, $$\int_O^L \sqrt{\frac{c(x)\rho(x)}{k(x)}}\, dx > 2\sqrt{\tau_B}$$

and the condition of the formula (5) is not met.

The results of the durability tests for the liquid jet recording heads of the Comparative Example 3 as well as other embodiments are shown in Table 8.

COMPARATIVE EXAMPLE 4

Figure 5A:
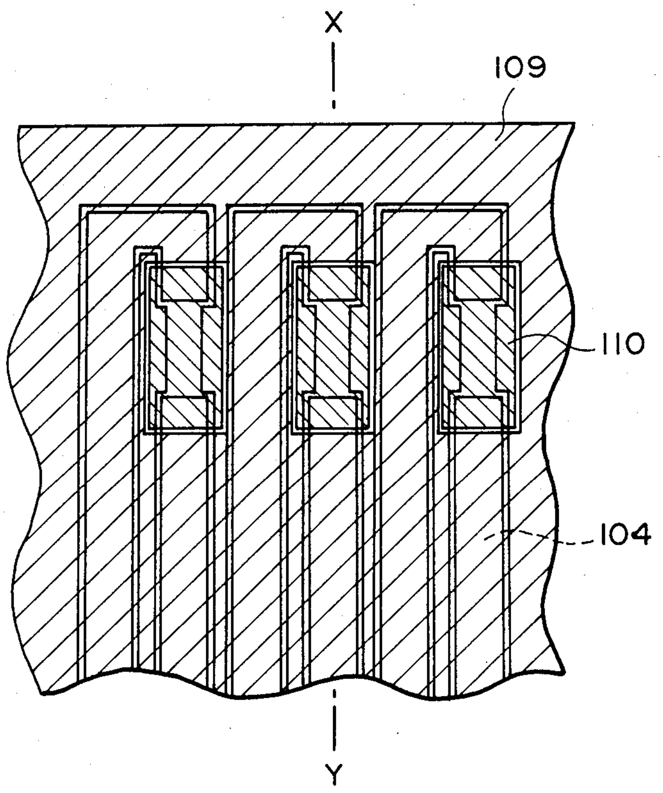
F I G. 5A PRIOR ART
Figure 5B:
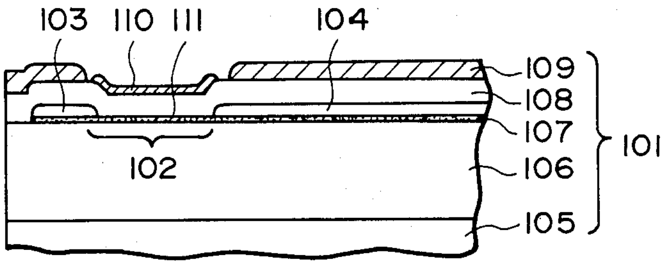
F I G. 5B PRIOR ART

FIGS. 5A and 5B show a substrate of a head formed as the Comparative Example 4 to the head of the present invention. This comparative example differs from other embodiments in the shape of the heat generating area (heater) 111. A $SiO_2$ film having a thickness of 5 μm is formed on a substrate support member 105 of a Si wafer by thermal oxidization to form a lower layer of the substrate 101. The other process of manufacturing the substrate, the structure of the liquid jet recording head and the materials and dimensions thereof are same as those of the Embodiment 10.

The discharge frequency response is 20 KHz for the Embodiments 10–12 and the Comparative Example 3. In the Comparative Example 4, the bubbles are unstable at the discharge frequency of 5 KHz, and the discharge volume is also unstable. As a result, the print quality is low.

The results of the durability tests for the liquid jet recording heads of the Comparative Example 4 as well as other embodiments are shown in Table 8.

Results of Durability Tests

The results of the durability tests for the Embodiments 10–12 and the Comparative Examples 3 and 4 are shown in Table 8.

TABLE 8

| Accumulated number of drive pulses | $5\times10^8$ pulses | $1\times10^9$ pulses |
|---|---|---|
| Emb. 10 | O | O |
| Emb. 11 | O | O |
| Emb. 12 | O | O |
| Comp. 3 | Δ | X |
| Comp. 4 | O | Δ |

O: Head residue 100%
Δ: Head residue ≧50%, <100%
X: Head residue ≧0%, <50%
Drive Condition: Drive voltage: 1.2 times of bubble generation voltage
Pulse width: 7 μs
Frequency: 2 KHz As seen from Table 8, the Embodiments 10 to 12 show very satisfactory durability but the Comparative Example 3 does not show a practically satisfactory durability and the Comparative Example 4 shows practically satisfactory durability and print quality.

Figure 1:
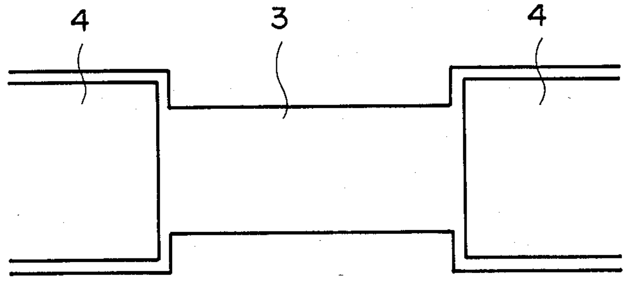
FIG. 1 PRIOR ART
FIG. 1 shows a schematic plan view for illustrating a shape of a conventional heat generating resistor.

It is thus seen that a liquid jet recording head having a very satisfactory durability and a very high print quality is provided if the heat generating area 111 and the area between the electrodes 101 and 103 are shaped to have no corner as shown in FIG. 1 and the condition of the formula (5)

$$\int_0^L \sqrt{\frac{c(x)\rho(x)}{k(x)}}\, dx < 2\sqrt{\tau_B}$$

is met.

In accordance with the present invention, the shape of the heat generating resistor of the liquid jet recording head has no corner and the materials and thicknesses of the films are selected to meet the condition of $$\int_0^L \sqrt{\frac{c(x)\rho(x)}{k(x)}}\, dx < 2\sqrt{\tau_B}$$

where k(x) is the thermal conductivity at the point x of the heat generating resistor layer measured from the boundary of the lower layer and the substrate, c(x) is the specific heat, $\rho(x)$ is the density, L is the thickness of the heat generating resistor and $\tau_B$ is the lifetime of the bubbles. As a result, the temperature of the heat generating resistor is sufficiently lowered before the bubble extinguish time and the problems of delay of bubble extinguishment, the residue of the bubble and the generation of secondary bubbles are solved, and the oxidization of the heat generating resistor by the bubbles and the break by the cavitation are prevented. As a result, the liquid jet recording head having practically satisfactory durability and print quality is provided.

Even if the ratio is no larger than 1.8, a recording head can be driven with a high durability if the applied voltage $V_{op}$ is appropriately selected, that is, if the drive voltage $V_{op}$ meets the relationship of $V_{op} \leqq 1.15\ V_R$, where $V_R$ is the threshold voltage. In the present invention, since the threshold voltage $V_R$ which is thermally set is used as a reference, an optimum drive voltage $V_{OP}$ can be set from the standpoint of heat resistivity so that the recording head can be driven at an optimum condition for durability and practical use and the durability of the recording head is improved.

This will be explained in further detail in connection with embodiments. It is assumed that the vapor bubbles generate in the heat acting area filled with the recording liquid and the secondary bubbles of the vapor bubbles are generated at the threshold voltage $V_R$ when the vapor bubbles self-contract after the droplet has been discharged from the orifice.

Embodiment 13

FIGS. 11 to 13 show a process of manufacturing a substrate of the Embodiment 13, and FIG. 14 shows a liquid jet recording head of the present embodiment. Numeral 101 denotes a substrate, numeral 102 denotes a heat generating area and numerals 103 and 104 denote electrodes.

The process of manufacturing the substrate of the heat generating resistor of the present embodiment is explained. As shown in FIG. 12B, a $SiO_2$ film having a thickness of 5 μm is formed by thermal oxidization of a Si wafer of a substrate support member 105 to form a lower layer 106 of the substrate 101. A heat generating resistor layer 107 made of $HfB_2$ having a thickness of 1300 Å is formed on the lower layer 106 by sputtering.

Then, a Ti layer (50 Å) and an Al layer (5000 Å) are continuously deposited by electron beam vapor deposition to form a common electrode 103 and a selection electrode 104. A circuit pattern shown in FIG. 11 is formed by photolithography. A heat acting surface of the heat generating area 102 of the heat generating unit 111 has a width of 30 μm and a length of 150 μm, and a resistance thereof including the Al electrodes 103 and 104 is 100 Ω.

Then, as shown in FIG. 12B, a $SiO_2$ film having a thickness of 1.6 μm is formed as a first upper protective layer 108 on the entire surface of the substrate 101 by magnetron type high rate sputtering method.

Then, as shown in FIGS. 12A and 12B, a Ta film having a thickness of 0.5 μm is formed as a second upper protective layer 110 by the magnetron type high rate sputtering method. Then, the second upper protective layer 110 is formed into a pattern to cover the top of the heat generating area 102 as shown in FIGS. 12A and 12B, by the photolithography.

Then, as shown in FIGS. 13A and 13B, a photosensitive polyimid (tradename Photoniece) is applied on the first upper protective layer 108 of the substrate 101 to form a third upper protective layer 109. It is formed into a pattern shown in FIG. 13 by photolithography.

As shown in FIG. 14, a photosensitive resin dry film 400 having a thickness of 50 μm is formed on the substrate 101 and it is exposed to a light through a predetermined pattern mask to form a liquid flow path 401 and a common liquid chamber 404. A top plate 405 made of glass is bonded to the film 400 by epoxy bonding material to form a liquid jet recording head. Numeral 402 denotes an orifice, numeral 403 denotes an ink flow path wall and numeral 406 denotes an ink supply port.

As an example, the liquid flow path 401 has a width of 50 μm, a height of 50 μm and a length of 750 μm. A length from a front end of the heat generating area (heater) to the orifice 402 is 150 μm.

The threshold voltage (minimum applied voltage) $V_R$ of the liquid jet recording head of the present embodiment is 22.0 volts. The bubble generation threshold voltage Vth is 20 volts when a drive signal has a pulse width of 7 μs and a frequency of 2 KHz. When the recording head of the present embodiment is driven by a voltage shown in Table 9, a durability shown in table 9 is attained under a drive condition of a pulse width of 7 μs and a frequency of 2 KHz, and a ink composition of water 50%, NMP (N-methyl pyrolidon) 15%, DEG (diethylene glycol) 30%, and dye 5%.

Embodiment 14

FIG. 15 shows a section of a substrate formed by the Embodiment 14. In the present embodiment, a $SiO_2$ film having a thickness of 2.5 μm is formed on a substrate support member 105 of a Si wafer by thermal oxidization to form a lower layer 106, and a heat generating layer 106 made of $HfB_2$ having a thickness of 1600 Å is formed on the lower layer 106 by sputtering. A resistance of the heat acting surface of the heat generating unit 111 including the Al electrodes 103 and 104 is 80 Ω. A $SiO_2$ film having a thickness of 1.9 μm is formed as a first upper protective layer 108 by magnetron type high rate sputtering method. The other process of manufacturing the substrate and the structure of the liquid jet recording head are same as those of the Embodiment 13.

The threshold voltage $V_R$ of the liquid jet recording head of the Embodiment 14 is 26.0 volts. The bubble generation threshold voltage Vth is 23.5 volts under a drive condition of a pulse width of a drive signal of 7 μs and a frequency of 2 KHz. When the recording head of the present embodiment is driven by the voltage shown in Table 10, a durability shown in Table 10 is attained under a drive condition of a pulse width of 7 μs and a frequency of 2 KHz, and ink composition of water 50%, NMP 15%, DEG 30% and dye 5%.

COMPARATIVE EXAMPLE 5

FIG. 5 shows a substrate manufactured by the Comparative Example 5. It differs from the Embodiment 13 in the shape of the heat acting area (heater). Other process of manufacturing the substrate and the structure of the liquid jet recording head are same as that of the Embodiment 13.

The bubble generation threshold voltage Vth of the liquid jet recording head of the Comparative Example 5 is 19.2 volts under a drive condition of a pulse width of 7 μs and a frequency of 2 KHz. When the recording head of this example is driven by the voltage shown in Table 11, a durability shown in Table 11 is attained under a drive condition of a pulse width of 7 μs and a frequency of 2 KHz, and ink composition of water 50%, NMP 15%, DEG 30% and dye 5%.

Results of Durability Tests

Table 9 shows the result of the durability test for the Embodiment 13, Table 10 shows the result of the durability test for the Embodiment 14, and Table 11 shows the result of the durability test for the Comparative Example 5.

TABLE 9

| Drive Voltage | Number of Drive Pulses (accumulated) | | |
|---|---|---|---|
| $V_{op}$ | $3 \times 10^8$ | $5 \times 10^8$ | $1 \times 10^9$ |
| 21 V | O | O | O |
| 23 V | O | O | O |
| 24 V | O | O | O |
| 25 V | O | O | O |
| 26 V | O | Δ | X |
| 27 V | Δ | X | X |

O: Recording head residue 100%
Δ: Recording head residue ≧50%, <100%
X: Recording head residue ≧0%, <50%

TABLE 10

| Drive Voltage | Number of Drive Pulses (accumulated) | | |
|---|---|---|---|
| $V_{op}$ | $3 \times 10^8$ | $5 \times 10^8$ | $1 \times 10^9$ |
| 25 V | O | O | O |
| 27 V | O | O | O |
| 29 V | O | O | O |
| 30 V | O | O | Δ |
| 31 V | O | Δ | X |
| 32 V | Δ | X | X |

O: Recording head residue 100%
Δ: Recording head residue ≧50%, <100%
X: Recording head residue ≧0%, <50%

TABLE 11

| Drive Voltage | Number of Drive Pulses (accumulated) | | |
|---|---|---|---|
| $V_{op}$ | $3 \times 10^8$ | $5 \times 10^8$ | $1 \times 10^9$ |
| 21 V | O | O | |
| 23 V | O | O | O |
| 24 V | O | O | O |
| 25 V | O | O | O |
| 26 V | O | Δ | X |
| 27 V | Δ | X | X |

O: Recording head residue 100%
Δ: Recording head residue ≧50%, <100%
X: Recording head residue ≧0%, <50%

The bubble generation threshold voltage Vth in the Embodiment 13 and the Comparative Example 5 are 20.0 volts and 19.2 volts, respectively. The film structures and the dimensions are same but the threshold voltages Vth are different. In the Comparative Example 5, the durability is high at 25 volts which is 1.3 times as high as Vth.

Accordingly, when the recording head is driven by a drive voltage $V_{op}$ which is no larger than 1.3 times of the threshold voltage Vth shown in DOLS 3224061, the high durability is attained. In the Embodiment 13, the durability is not so high when the recording head is driven at 26 volts which is 1.3 times as large as the threshold voltage Vth. Accordingly, when the drive voltage $V_{op}$ is determined to be no longer than 1.3 times of the threshold voltage Vth shown in DOLS 3224061, that is, with reference to Vth, the durability which the recording head potentially has cannot be fully derived. The inventors of the present invention consider as follows.

As seen from Tables 9 and 10, the relative durability is lowered when the voltage is higher than a certain level. For example, in the Embodiment 13, the relative durability is lowered when the drive voltage $V_{op}$ is higher than 26 volts (Table 9). The threshold voltage $V_R$ for the generation of the secondary vapor bubbles in the Embodiment 13 is 22 volts, and $V_{op}/V_R=1.18$. In the Embodiment 14, the relative durability is lowered when the drive voltage $V_{op}$ is higher than 30 volts (Table 10). Since the threshold voltage $V_R$ of the Embodiment 14 is 26 volts, $V_{op}/V_R$ is equal to 1.15.

Accordingly, when $V_{op}/V_R \leqq 1.15$, the durability of the recording head is high enough for practical use.

In accordance with the present invention, the recording head is driven by the drive voltage $V_{op}$ which meets the condition of $V_{op}/V_R \leqq 1.15$ where $V_R$ is the threshold voltage. Thus, the liquid jet recording head is driven under the condition which is optimum for durability and practical use, and the high durability of the recording head is attained.

We claim:

1. A planar heat generating resistor which has a heat generating resistor layer formed on or above a support member and a pair of opposing electrodes formed on the heat generating resistor layer a width of the heat generating resistor layer at the electrode area being larger than a width of the electrodes and a voltage being applied across the electrodes, wherein a ratio of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor is no larger than 1.4 when a Laplace equation $\partial^2\phi/\partial x^2+\partial^2\phi/\partial y^2=0$ is solved for the heat generating resistor when an orthogonal coordinate system X-Y is defined on the resistor surface, a potential at a point (x,y) on the resistor surface is represented by $\phi(x,y)$, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes.

2. A liquid jet recording head comprising an orifice for discharging liquid, a liquid flow path communicating with the orifice, a heat generating resistor arranged in the liquid flow path for generating thermal energy to discharge the liquid, the heat generating resistor including a heat generating resistor layer formed on or above a support member and a pair of opposing electrodes formed on the heat generating resistor layer, a width of the heat generating resistor layer at an electrode area being larger than a width of the electrodes, a voltage being applied across the electrodes, the heat generating resistor having a ratio of no larger than 1.4 of a maximum value of a gradient $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the heat generating resistor area when an orthogonal coordinate system X-Y is defined on a surface of the resistor, a potential at a point (x,y) on the resistor surface is represented by $\phi(x,y)$, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is imparted to an area which does not contact to any of the electrode.

3. A recording head having a heat generating resistor according to claim 1.

4. A planar heat generating resistor according to claim 1, wherein said resistor has a lower layer between said support member and said heat generating layer.

5. A planar heat generating resistor according to claim 1, wherein said resistor has an upper layer on said heat generating resistor layer.

6. A liquid jet recording head having a heat acting area communicating with an orifice for discharging liquid for forming bubbles in the liquid by applying thermal energy to the liquid, and a heat generating resistor for generating the thermal energy, the heat generating resistor including a heat generating resistor layer formed on a lower layer formed on or above a support member and a pair of opposing electrodes formed on the heat generating resistor layer, a width of the heat generating resistor at an electrode area being larger than a width of the electrodes, a voltage being applied across the electrodes, an upper layer being formed on the heat generating resistor, the heat generating resistor having a ratio of no larger than 1.8 of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the area of the heat generating resistor when an orthogonal coordinate system X-y is defined on a surface of the heat generating resistor, $\phi(x,y)$ is defined as a potential at a point (x,y) on the surface of the resistor, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes, and the heat generating resistor meeting the following condition $$\int_0^L \sqrt{\frac{C(x)\rho(x)}{k(x)}}\,dx < 2\sqrt{\tau B}$$

where k(x) is a thermal conductivity of a material at a position x measured in the direction of the lower layer from the boundary of the layer and the support member to the heat acting area, c(x) is a specific heat, $\rho(x)$ is a density, L is a total thickness from the boundary of the lower layer and the support member of the heat generating resistor and $\tau_B$ is a time from start of application of the heat energy to extinguishment of the bubbles.

7. A method for driving a liquid jet recording head having a heat acting area communicating with an orifice for discharging liquid for imparting thermal energy to the liquid and a heat generating resistor for generating the thermal energy, the heat generating resistor including a heat generating resistor layer formed on or above a support member and a pair of opposing electrodes formed on the heat generating resistor layer, a width of the heat generating resistor layer in an electrode area being larger than a width of the electrodes, a voltage being applied across the electrodes, the heat generaing resistor having a ratio of no longer than 1.8 of a maximum value of a gradient of $\phi$, $\sqrt{(\partial\phi/\partial x)^2+(\partial\phi/\partial y)^2}$ to a value of $\sqrt{(\partial\phi/\partial x)^2+(\partial\phi/\partial y)^2}$ at a center of the resistor when a Laplace equation $\partial^2\phi/\partial x^2+\partial^2\phi/\partial y^2=0$ is solved for the area of the heat generating resistor when an orthogonal coordinate system X-Y is defined on the surface of the heat generating resistor, $\phi(x,y)$ is defined as a potential at a point (x,y) on the surface of the heat generating resistor, a boundary value is imparted to an area of a circumferential boundary of the resistor which contacts to one of the electrodes, a different boundary value is imparted to an area which contacts to the other electrode, and a boundary condition in which a differential coefficient of $\phi$ to a normal direction of the circumferential boundary is zero is imparted to an area which does not contact to any of the electrodes, the applied voltage Vop to the heat generating resistor being selected to meet a relationship of $1.15 \geqq Vop/V_R$ where $V_R$ is a minimum applied voltage to the heat generating resistor at which bubbles (secondary bubbles) other than the bubbles for discharging the liquid are generated at the heat acting area.

8. A method according to claim 7 wherein, said voltage Vop satisfies the relationship $Vop \leqq 1.3$ Vth wherein Vth is a minimum value of the applied voltage by which said bubbles for discharging the liquid are generated is generated.

9. A method according to claim 7, wherein said heat generating resistor has a lower layer between said support member and said heat generating resistor layer.

10. A method according to claim 8, wherein said heat generating resistor has an upper layer on said heat generating resistor layer.

* * * * *

UNITED STATES PATENT AND TRADEMARK OFFICE
CERTIFICATE OF CORRECTION

PATENT NO. : 4,719,478

DATED : January 12, 1988

INVENTOR(S) : MASAYOSHI TACHIHARA, ET AL.

It is certified that error appears in the above-identified patent and that said Letters Patent is hereby corrected as shown below:

AT [57] IN ABSTRACT

Line 11, "$\partial^2/\partial x^2+\partial^2\phi/\partial y^2=0$" should read --$\partial^2\phi/\partial x^2+\partial^2\phi/\partial y^2=0$--.

COLUMN 1

Line 30, "wide" should read --wider--.
Line 68, "act" should read --acts--.

COLUMN 2

Line 32, "self-contraction more" should read --self-contraction. More--.

COLUMN 3

Line 2, "dimension" should read --dimensions--.
Line 65, "$\sqrt{}(\partial\phi/\partial x)^2+\overline{(\partial\phi/\partial y)^2}$" should read --$\sqrt{(\partial\phi/\partial x)^2+(\partial\phi/\partial y)^2}$--.
Line 66, "$\sqrt{}(\partial\phi/\partial x^2+\overline{(\partial\phi/\partial y)^2}$" should read --$\sqrt{(\partial\phi/\partial x)^2+(\partial\phi/\partial y)^2}$--.
Line 68, "$\partial^2\phi/\partial x^2+\partial\phi/\partial y^2$" should read --$\partial^2\phi/\partial x^2+\partial^2\phi/\partial y^2$--.

COLUMN 4

Line 39, "electrode." should read --electrodes.--.

UNITED STATES PATENT AND TRADEMARK OFFICE

CERTIFICATE OF CORRECTION

PATENT NO. : 4,719,478

DATED : January 12, 1988

INVENTOR(S) : MASAYOSHI TACHIHARA, ET AL. Page 2 of 4

It is certified that error appears in the above-identified patent and that said Letters Patent is hereby corrected as shown below:

COLUMN 5

Line 35, "orthogonal coordinate system x-y" should read --orthogonal coordinate system X-Y--.

COLUMN 6

Line 21, "resister" should read --resistor--.

COLUMN 7

Line 9, "Comparative Example 1" should read --COMPARATIVE EXAMPLE 1--
Line 17, "FIG. 2A," should read --FIG. 2A.--.

COLUMN 8

Line 32, "other" should read --another--.
Line 53, "comparative Example 1." should read --Comparative Example 1.--.

COLUMN 10

Line 3, "space" should read --spaced--.
Line 36, "strip" should read --stripe--.

COLUMN 12

Line 40, "bubble" should read --bubbles--.

UNITED STATES PATENT AND TRADEMARK OFFICE

CERTIFICATE OF CORRECTION

PATENT NO. : 4,719,478

DATED : January 12, 1988

INVENTOR(S) : MASAYOSHI TACHIHARA, ET AL. Page 3 of 4

It is certified that error appears in the above-identified patent and that said Letters Patent is hereby corrected as shown below:

COLUMN 13

Line 1, "resistor" should read --resistance--.
Line 34, "entinguishment" should read --extinguishment--.

COLUMN 15

Line 49, "of" (first occurrence) should be deleted.

COLUMN 16

Line 6, "$2.0 X 10^{2}<1.4 X 10^{2}$," should read --$2.0 X 10^{2}>1.4 X 10^{2}$--.

COLUMN 18

Line 40, "table" should read --Table--.
Line 42, "a" (second occurrence) should read --an--.
Line 52, "layer 106" should read --layer 107--.
Line 59, "process" should read --processes--.

COLUMN 19

Line 9, "cess" should read --cesses--.
Line 65, "voltage Vth" should read --voltages Vth--.

COLUMN 20

Line 11, "longer" should read --larger--.
Line 41, "layer" should read --layer,--.

UNITED STATES PATENT AND TRADEMARK OFFICE

CERTIFICATE OF CORRECTION

PATENT NO. : 4,719,478

DATED : January 12, 1988

INVENTOR(S) : MASAYOSHI TACHIHARA, ET AL.

It is certified that error appears in the above-identified patent and that said Letters Patent is hereby corrected as shown below:

COLUMN 21

Line 19, "electrode." should read --electrodes.--.
Line 47, "coordinate system X-y" should read --coordinate system X-Y--.

COLUMN 22

Lines 2-4, "$\int_0^l \sqrt{\frac{C(x)p(x)}{k(x)}}\,dx<2\sqrt{\tau B}$" should read --$\int_0^l \sqrt{\frac{c(x)p(x)}{k(x)}}\,dx<2\sqrt{\tau_B}$--.
Line 24, "generaing" should read --generating--.
Line 25, "longer" should read --larger--.
Line 47, "claim 7 wherein," should read --claim 7, wherein--.

Signed and Sealed this

Fifteenth Day of August, 1989

Attest:

DONALD J. QUIGG

Attesting Officer

Commissioner of Patents and Trademarks